(12) United States Patent
Kitamura et al.

(10) Patent No.: US 10,770,231 B2
(45) Date of Patent: Sep. 8, 2020

(54) MULTILAYER CERAMIC ELECTRONIC COMPONENT

(71) Applicant: TAIYO YUDEN CO., LTD., Chuo-ku, Tokyo (JP)

(72) Inventors: Shohei Kitamura, Takasaki (JP); Toru Makino, Takasaki (JP); Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/836,730

(22) Filed: Dec. 8, 2017

(65) Prior Publication Data
US 2018/0174754 A1    Jun. 21, 2018

(30) Foreign Application Priority Data
Dec. 16, 2016 (JP) .................. 2016-244041

(51) Int. Cl.
| | |
|---|---|
| C04B 35/468 | (2006.01) |
| C04B 35/626 | (2006.01) |
| H01G 4/005 | (2006.01) |
| H01G 4/12 | (2006.01) |
| H01G 4/258 | (2006.01) |
| B32B 9/00 | (2006.01) |
| H01G 4/30 | (2006.01) |
| H01G 4/224 | (2006.01) |

(52) U.S. Cl.
CPC ............ *H01G 4/258* (2013.01); *B32B 9/005* (2013.01); *C04B 35/468* (2013.01); *C04B 35/62605* (2013.01); *H01G 4/005* (2013.01); *H01G 4/12* (2013.01); *H01G 4/224* (2013.01); *H01G 4/30* (2013.01); *H01G 4/1227* (2013.01)

(58) Field of Classification Search
CPC ..... B32B 9/005; C04B 35/468; C04B 35/626; C04B 35/62605; H01G 4/005; H01G 4/12; H01G 4/1227; H01G 4/258; H01G 4/224; H01G 4/30; H01G 13/00
USPC ........................................ 361/321.2
See application file for complete search history.

(56) References Cited

U.S. PATENT DOCUMENTS

| | | | |
|---|---|---|---|
| 9,899,152 B2* | 2/2018 | Osada ..................... | H01G 4/232 |
| 10,014,237 B2* | 7/2018 | Kooriyama ............. | H01L 23/15 |

(Continued)

FOREIGN PATENT DOCUMENTS

| | | | | |
|---|---|---|---|---|
| JP | 2001044066 A | * | 2/2001 | ............... H01G 4/12 |
| JP | 2005251940 A | | 9/2005 | |

*Primary Examiner* — Timothy J Thompson
*Assistant Examiner* — Guillermo J Egoavil
(74) *Attorney, Agent, or Firm* — Law Office of Katsuhiro Arai

(57) ABSTRACT

In an embodiment, a multilayer ceramic capacitor 10 includes external electrodes 12 on both of first-direction ends of a capacitor body 11. Also, groups of metal grains 13 are provided on one third-direction face and another third-direction face of the capacitor body 11. Both of the first-direction ends of the groups of metal grains 13 provided on the other third-direction face of the capacitor body 11 are covered by second parts 12c of the respective external electrodes 12, while both of the first-direction ends of the groups of metal grains 13 provided on the one third-direction face of the capacitor body 11 are covered by first parts 12b of the respective external electrodes 12. The multilayer ceramic electronic component can offer excellent heat dissipation property.

14 Claims, 8 Drawing Sheets

(56) References Cited

U.S. PATENT DOCUMENTS

| | | | |
|---|---|---|---|
| 2009/0073635 A1* | 3/2009 | Taniguchi | C04B 35/4682 361/321.4 |
| 2010/0055843 A1* | 3/2010 | Liu | H01L 23/3677 438/122 |
| 2010/0128412 A1* | 5/2010 | Nishihara | H01G 4/2325 361/306.3 |
| 2013/0049532 A1* | 2/2013 | Kim | H01G 4/30 310/311 |
| 2014/0009864 A1* | 1/2014 | Takashima | C04B 35/4682 361/301.4 |
| 2015/0109718 A1* | 4/2015 | Choi | H01G 2/06 361/304 |
| 2017/0018360 A1* | 1/2017 | Osada | H01G 4/232 |

* cited by examiner

MULTILAYER CERAMIC ELECTRONIC COMPONENT

BACKGROUND

Field of the Invention

The present invention relates to a multilayer ceramic electronic component, such as a multilayer ceramic capacitor or multilayer ceramic inductor.

Description of the Related Art

Among multilayer ceramic electronic components such as multilayer ceramic capacitors and multilayer ceramic inductors, multilayer ceramic capacitors, for example, are each comprised, in general, of a capacitor body of roughly rectangular solid shape which has a capacitive part constituted by multiple internal electrode layers stacked together with dielectric layers in between, and a pair of external electrodes provided on the capacitor body. Some of the multiple internal electrode layers are connected to one of the external electrodes, while the remainder of the multiple internal electrode layers are connected to the other of the external electrodes.

Incidentally, the aforementioned multilayer ceramic capacitors have a resistance component (Equivalent Series Resistance, or ESR), so when ripple current, noise current, or other alternating current flows through them, these multilayer ceramic capacitors self-heat due to this resistance component. This heat is released to the outside from the surface of the capacitor body and from the surface of each external electrode; however, sufficient heat dissipation cannot be expected this way, particularly with multilayer ceramic capacitors in small sizes, and therefore concerns arise that the capacitance may drop or other functional problems may occur.

Disclosed in Patent Literature 1 is a multilayer ceramic capacitor characterized in that the heat-dissipating internal electrodes provided in the capacitor body are connected to the external electrodes. With this type of multilayer ceramic capacitor, however, particularly one in a small size, it is difficult to make the dimensions of heat-dissipating internal electrodes larger because the capacitor has a structure with which structure an increase of the dimensions of the heat-dissipating internal electrodes decreases the capacitance. In other words, using this type of multilayer ceramic capacitor to achieve sufficient heat-dissipation effect to dispel the aforementioned concerns is realistically difficult.

It should be noted that the aforementioned functional problems arising from the fact that sufficient heat dissipation cannot be expected are not limited to multilayer ceramic capacitors; instead, the problems can occur just the same with other multilayer ceramic electronic components such as multilayer ceramic inductors, each comprising a component body of roughly rectangular solid shape which has internal conductor layers and a pair of external electrodes which are provided on the component body and also connected to the internal conductor layers, in particular, on multilayer ceramic electronic components in small sizes.

BACKGROUND ART LITERATURES

[Patent Literature 1] Japanese Patent Laid-open No. 2005-251940

SUMMARY

An object of the present invention is to provide a multilayer ceramic electronic component offering excellent heat dissipation property.

Any discussion of problems and solutions involved in the related art has been included in this disclosure solely for the purposes of providing a context for the present invention, and should not be taken as an admission that any or all of the discussion were known at the time the invention was made.

To solve the aforementioned problems, the multilayer ceramic electronic component pertaining to the present invention is a multilayer ceramic electronic component comprising a component body of roughly rectangular solid shape having internal conductor layers, and a pair of external electrodes provided on the component body and also connected to the internal conductor layers, wherein: when, of the six faces of the component body, the direction in which a pair of faces are opposing each other is given as a first direction, the direction in which another pair of faces are opposing each other is given as a second direction, and the direction in which the remaining pair of faces are opposing each other is given as a third direction, each of the external electrodes continuously has one of base parts present on a first-direction face of the component body, and one of first parts present at least on one third-direction face, among one third-direction face, the other third-direction face, one second-direction face, and the other second-direction face, of the component body; and groups of metal grains are provided over the first direction of the component body, on at least the other third-direction face, among one third-direction face and the other third-direction face, of the component body.

According to the multilayer ceramic electronic component pertaining to the present invention, excellent heat dissipation property can be demonstrated.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS 10, 10-1, 10-2, 10-3, 10-4, 10-5, 10-6, 10-7, 20, 20-1, 20-2, 20-3, 20-4 - - - Multilayer ceramic capacitor, 11 - - - Capacitor body, 11a - - - Capacitive part, 11a1 - - - Internal electrode layers, 11a2 - - - Dielectric layers, 11b - - - Dielectric margin parts, 12, 12-1, 12-2 - - - External electrodes, 12a - - - Base parts, 12b - - - First parts, 12c - - - Second parts, 12d - - - Third parts, 12e - - - Fourth parts, 13 - - - Groups of metal grains, 13a, 13b - - - Metal grains, 14 - - - Groups of metal grains, 14a - - - Metal grains.

DETAILED DESCRIPTION OF EMBODIMENTS

First Embodiment

This first embodiment is an application of the present invention to a multilayer ceramic capacitor. First, the structure of a multilayer ceramic capacitor 10 pertaining to the first embodiment of the present invention is explained using FIGS. 1 to 3. It should be noted that, in the explanation below, the following representation is used for the sake of convenience: that is, of the six faces of a capacitor body 11 of roughly rectangular solid shape as mentioned below, the direction in which a pair of faces are opposing each other (corresponding to the lateral direction in FIG. 1) is indicated as a first direction, the direction in which another pair of faces are opposing each other (corresponding to the vertical direction in FIG. 1) is indicated as a second direction, and the direction in which the remaining pair of faces are opposing each other (corresponding to the vertical direction in FIG. 2) is indicated as a third direction, while the dimensions along the respective directions are indicated as a first-direction dimension, a second-direction dimension, and a third-direction dimension. Also, in the following explanation, the term "reference dimension" means a design reference dimension that does not include any dimensional tolerance.

Figure 1:
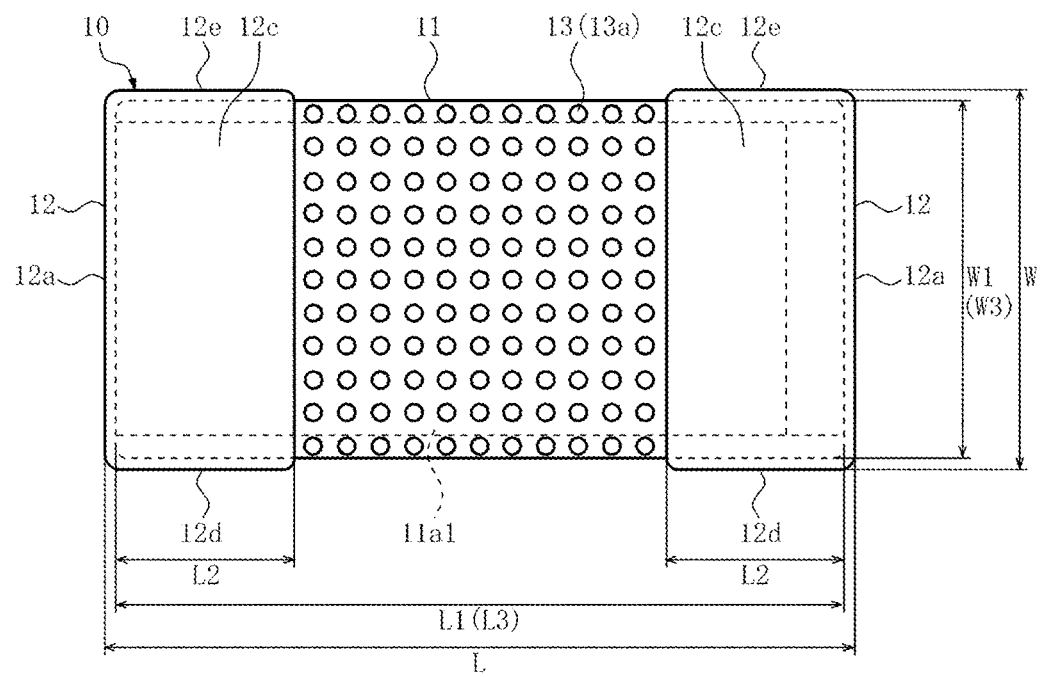
FIG. 1 is a plan view of the multilayer ceramic capacitor pertaining to the first embodiment of the present invention.
Figure 2:
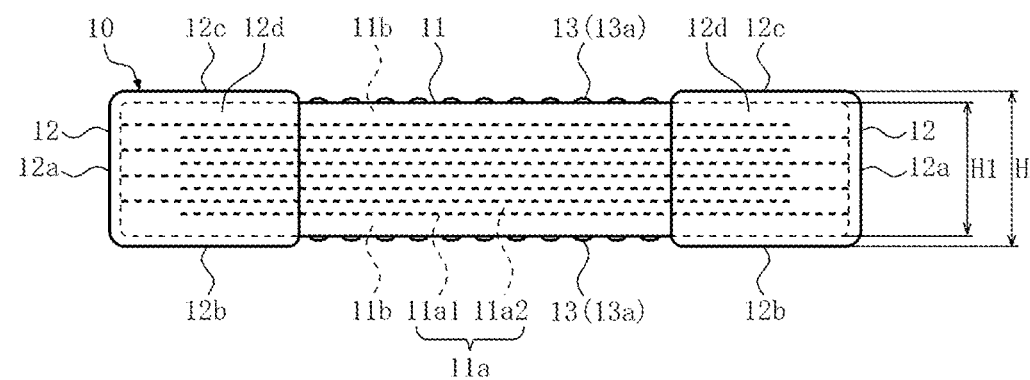
FIG. 2 is a side view of the multilayer ceramic capacitor shown in FIG. 1.
Figure 3:
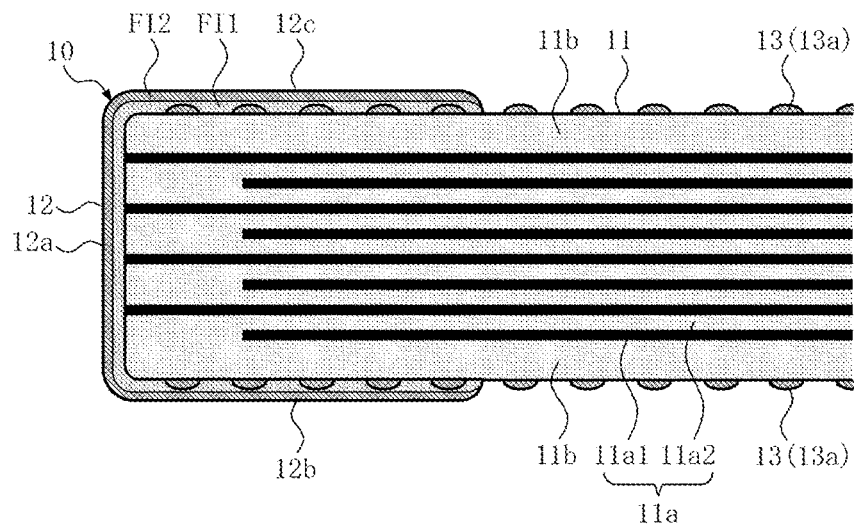
FIG. 3 is a partially enlarged cross-sectional view of the multilayer ceramic capacitor shown in FIG. 2.

The size of the multilayer ceramic capacitor 10 shown in FIGS. 1 to 3 is regulated by a first-direction reference dimension L, a second-direction reference dimension W, and a third-direction reference dimension H. For reference, the L, W, and H of a prototype on which FIGS. 1 to 3 are based, are 1000 µm, 500 µm, and 200 µm, respectively. Obviously, the relation of the L, W, and H of the multilayer ceramic capacitor 10 may be "L>W=H," "L>H>W," "W>L>H," "W>L=H," "W>H>L," etc., other than "L>W>H." This multilayer ceramic capacitor 10 comprises a capacitor body 11, external electrodes 12 provided on both of the first-direction ends of the capacitor body 11, and groups of metal grains 13 provided on both of the third-direction faces of the capacitor body 11.

The capacitor body 11 is shaped roughly as a rectangular solid having a first-direction reference dimension L1, a second-direction reference dimension W1, and a third-direction reference dimension H1. This capacitor body 11 has a capacitive part 11a constituted by multiple internal electrode layers 11a1 stacked together with dielectric layers 11a2 in between, and dielectric margin parts 11b provided on both of the third-direction sides of the capacitive part 11a. It should be noted that, while FIGS. 2 and 3 depict a total of eight internal electrode layers 11a1 for the convenience of illustration, the number of the internal electrode layers 11a1 is not limited in any way.

Some (the odd-numbered ones from the top in FIG. 2) of the multiple internal electrode layers 11a1 are connected to one of base parts 12a of one (the left side in FIGS. 1 and 2) of the external electrodes 12. Also, the remainder (the even-numbered ones from the top in FIG. 2) of the multiple internal electrode layers 11a1 are connected to the other of the base parts 12a of the other (the right side in FIGS. 1 and 2) of the external electrodes 12.

Each of the internal electrode layers 11a1 has a roughly rectangular outer shape. A first-direction reference dimension (not accompanied by a symbol) of each of the internal electrode layers 11a1 is smaller than the first-direction reference dimension L1 of the capacitor body 11, while a second-direction reference dimension (not accompanied by a symbol) of each of the internal electrode layers 11a1 is smaller than the second-direction reference dimension W1 of the capacitor body 11. Also, a third-direction reference dimension (not accompanied by a symbol) of each of the internal electrode layers 11a1 is set in a range of 0.3 to 3 μm, for example.

Each of the dielectric layers 11a2 has a roughly rectangular outer shape. A first-direction reference dimension (not accompanied by a symbol) of each of the dielectric layers 11a2 is the same as the first-direction reference dimension L1 of the capacitor body 11, while a second-direction reference dimension (not accompanied by a symbol) of each of the dielectric layers 11a2 is the same as the second-direction reference dimension W1 of the capacitor body 11. Also, a third-direction reference dimension (not accompanied by a symbol) of each of the dielectric layers 11a2 is set in a range of 0.3 to 3 μm, for example.

Each of the dielectric margin parts 11b has a roughly rectangular outer shape. A first-direction reference dimension (not accompanied by a symbol) of each of the dielectric margin parts 11b is the same as the first-direction reference dimension L1 of the capacitor body 11, while a second-direction reference dimension (not accompanied by a symbol) of each of the dielectric margin parts 11b is the same as the second-direction reference dimension W1 of the capacitor body 11. Also, a third-direction reference dimension (not accompanied by a symbol) of each of the dielectric margin parts 11b is set in a range of 5 to 30 μm, for example.

The primary component of each of the internal electrode layers 11a1 is nickel, copper, palladium, platinum, silver, gold, alloy thereof, or other metal material, for example. The primary component of each of the dielectric layers 11a2 and that of each of the dielectric margin parts 11b, or specifically the primary component of the capacitor body 11 excluding the internal electrode layers 11a1, is barium titanate, strontium titanate, calcium titanate, magnesium titanate, calcium zirconate, calcium zirconate titanate, barium zirconate, or other dielectric material such as titanium oxide (dielectric ceramic material), for example. It should be noted that the primary component of each of the dielectric layers 11a2 may be the same as, or different from, the primary component of each of the dielectric margin parts 11b.

One (the left side in FIGS. 1 and 2) of the external electrodes 12 continuously has one of the base parts 12a present on one first-direction face (the left face in FIGS. 1 and 2) of the capacitor body 11, one of first parts 12b present on one third-direction face (the bottom face in FIG. 2) of the capacitor body 11, one of second parts 12c present on the other third-direction face (the top face in FIG. 2) of the capacitor body 11, one of third parts 12d present on one second-direction face (the bottom face in FIG. 1) of the capacitor body 11, and one of fourth parts 12e present on the other second-direction face (the top face in FIG. 1) of the capacitor body 11.

The other (the right side in FIGS. 1 and 2) of the external electrodes 12 continuously has the other of the base parts 12a present on the other first-direction face (the right face in FIGS. 1 and 2) of the capacitor body 11, the other of the first parts 12b present on one third-direction face (the bottom face in FIG. 2) of the capacitor body 11, the other of the second parts 12c present on the other third-direction face (the top face in FIG. 2) of the capacitor body 11, the other of the third parts 12d present on one second-direction face (the bottom face in FIG. 1) of the capacitor body 11, and the other of the fourth parts 12e present on the other second-direction face (the top face in FIG. 1) of the capacitor body 11.

A first-direction reference dimension (not accompanied by a symbol) of each of the base parts 12a, a third-direction reference dimension (not accompanied by symbols) of each of the first parts 12b and the second parts 12c, and a second-direction reference dimension (not accompanied by symbols) of each of the third parts 12d and the fourth parts 12e, of each of the external electrodes 12, are set in a range of 5 to 30 μm, for example. Also, a first-direction reference dimension L2 of each of the first parts 12b to the fourth parts 12e of each of the external electrodes 12 is set in a range of one-fifth to two-fifths of the first-direction reference dimension L of the multilayer ceramic capacitor 10, for example.

As shown in FIG. 3, each of the external electrodes 12 is constituted by each of base conductor films FI1 contacting the first-direction faces (both the left face and right face in FIGS. 1 and 2), one third-direction face (the bottom face in FIG. 2), the other third-direction face (the top face in FIG. 2), one second-direction face (the bottom face in FIG. 1), and the other second-direction face (the top face in FIG. 1), of the capacitor body 11, and also by each of surface conductor films FI2 contacting the surface of each of the base conductor films FI1.

The primary component of each of the base conductor films FI1 is nickel, copper, palladium, platinum, silver, gold, alloy thereof, or other metal material, for example. Also, the primary component of each of the surface conductor films FI2 is copper, nickel, tin, palladium, gold, zinc, alloy thereof, or other metal material, for example. It should be noted that, although FIG. 3 depicts each of the external electrodes 12 as being constituted by each of the base conductor films FI1 and each of the surface conductor films FI2 for the convenience of illustration, each of the external electrodes 12 may adopt a constitution whereby one or more intermediate conductor film(s), whose primary component is different, is/are present between each of the base conductor films FI1 and each of the surface conductor films FI2.

Each of the groups of metal grains 13, constituted by multiple metal grains 13a of roughly uniform outer shape that are arranged regularly, is provided over the first direction of the capacitor body 11 on both of the third-direction faces of the capacitor body 11. To be specific, the multiple metal grains 13a each have a circular outer shape, and they are arranged in a matrix pattern. Also, the multiple metal grains 13a constituting the group of metal grains 13 on each of the faces (wherein metal grains provided on one face of the capacitor body is considered as "a group of metal grains" in this context, or "a group of metal grains" may refer to a particular species or locations of metal grains or a genus including multiple groups of metal grains depending on the context) are arranged such that a space is present between the adjacent metal grains 13a, as a rule, which means that even when the metal grains 13a themselves have conductivity, electrical current does not flow through each of the groups of metal grains 13. In other words, the insulation resistance value between the external electrodes 12 which are opposed to each other across each of the groups of metal grains 13 is $5.0 \times 10^5 \Omega$ or higher (measured based on application of rated voltage and a charge time of 120 seconds).

On both of the third-direction faces of the capacitor body 11, a first-direction reference dimension L3 of the area on which each of the groups of metal grains 13 is provided is the same as the first-direction reference dimension L1 of the capacitor body 11, while a second-direction reference dimension W3 of the area is the same as the second-direction reference dimension W1 of the capacitor body 11. Also, preferably the maximum grain dimension among the multiple metal grains 13a, constituting each of the groups of metal grains 13, as viewed from the outer side in the third direction (grain dimension in the direction rendering the size the largest), is set in a range of 1 to 300 μm. In addition, preferably a third-direction reference dimension (not accompanied by a symbol) of the multiple metal grains 13a constituting each of the groups of metal grains 13 is set in a range of 0.3 to 3 μm. In other words, the third-direction reference dimension (not accompanied by a symbol) of the multiple metal grains 13a constituting each of the groups of metal grains 13 is smaller than the third-direction reference dimension (not accompanied by a symbol) of each of the first parts 12b and the second parts 12c of each of the external electrodes 12.

The groups of metal grains 13 provided on one third-direction face (the bottom face in FIG. 2) of the capacitor body 11 are covered by the first parts 12b of the respective external electrodes 12 at both of the first-direction ends, while the groups of metal grains 13 in the area other than both of the first-direction ends are exposed. Also, the groups of metal grains 13 provided on the other third-direction face (the top face in FIG. 2) of the capacitor body 11 are covered by the second parts 12c of the respective external electrodes 12 at both of the first-direction ends, while the groups of metal grains 13 in the area other than both of the first-direction ends are exposed.

Figure 4:
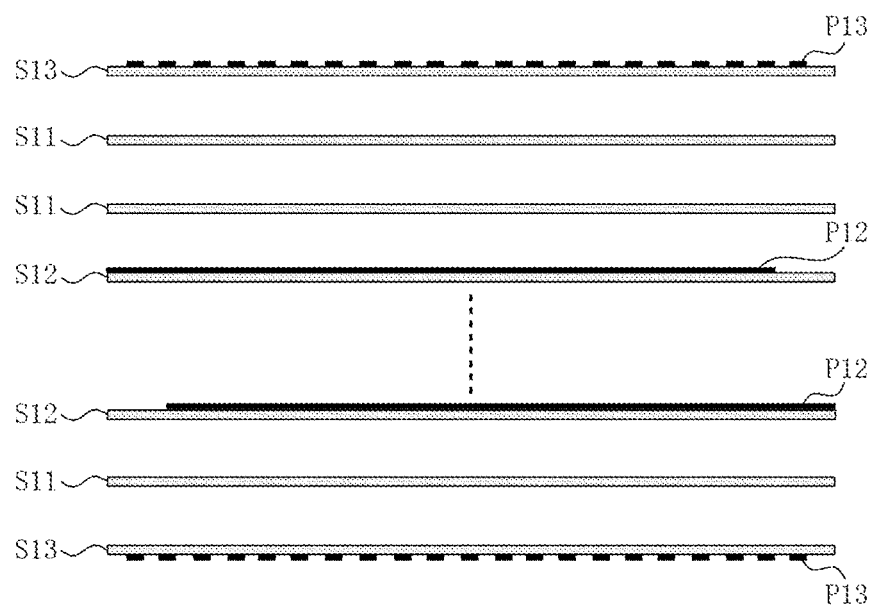
FIG. 4 is a drawing explaining an example of how the multilayer ceramic capacitor shown in FIGS. 1 to 3 is manufactured.
Figure 5:
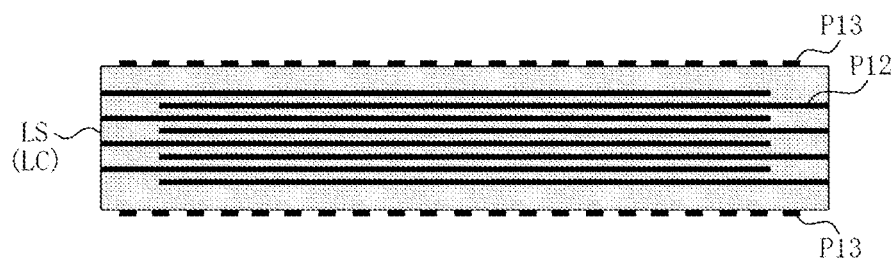
FIG. 5 is a drawing explaining an example of how the multilayer ceramic capacitor shown in FIGS. 1 to 3 is manufactured.
Figure 6:
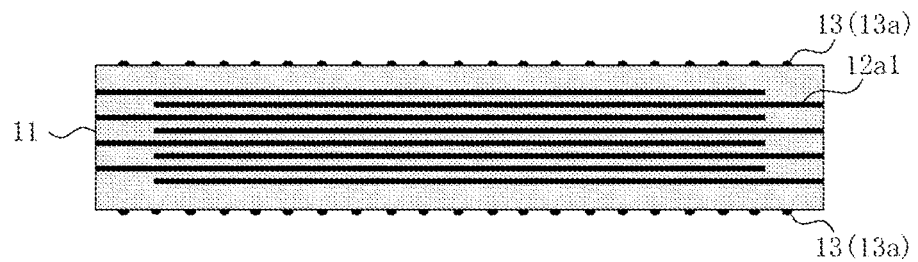
FIG. 6 is a drawing explaining an example of how the multilayer ceramic capacitor shown in FIGS. 1 to 3 is manufactured.

Next, an example of how the aforementioned multilayer ceramic capacitor 10 is manufactured, or specifically an example of manufacturing method when the primary component of the capacitor body 11 excluding the internal electrode layers 11a1 is barium titanate, is explained; the primary component of each of the internal electrode layers 11a1, the primary component of each of the base conductor films FI1 of each of the external electrodes 12, and the primary component of each of the groups of metal grains 13 are all nickel; and each of the surface conductor films FI2 of each of the external electrodes 12 is constituted by one film whose primary component is tin, is explained using FIGS. 4 to 6 and quoting the symbols indicated in FIGS. 1 to 3. The manufacturing method explained here is only an example and does not limit in any way how the aforementioned multilayer ceramic capacitor 10 is manufactured.

For the manufacture, first a ceramic slurry containing barium titanate powder, organic solvent, organic binder, dispersant, etc., and an electrode paste containing nickel powder, organic solvent, organic binder, dispersant, etc., are prepared.

Next, as shown in FIG. 4, the ceramic slurry is coated on the surface of a carrier film and then dried, to produce each of first sheets (green sheets) S11. Also, the electrode paste is printed on the surface of each of the first sheets S11 and then dried, to produce each of second sheets S12 with a group of unsintered matrix- or staggeringly arranged internal electrode layer patterns P12 which is formed on the surface of each of the first sheets S11. Furthermore, the electrode paste is printed on the surface of each of the first sheets S11 and then dried, to produce each of third sheets S13 with a group of unsintered matrix-arranged metal gain patterns P13 which are formed on the surface of each of the first sheets S11. It should be noted that, while FIG. 4 depicts the first sheets S11, the second sheets S12, and the third sheets S13 corresponding to one piece of the multilayer ceramic capacitor 10 for the purpose of illustration, each of the actual sheets S11, S12, and S13 is sized in such a way that multiple multilayer ceramic capacitors can be taken from them.

Next, a prescribed number of the first sheets S11 are stacked and thermally compressed one by one, to form a section corresponding to one of the dielectric margin parts 11b in the third direction. Then, a prescribed number of the second sheets S12 (including the groups of unsintered internal electrode layer patterns P12) are stacked and thermally compressed one by one, to form a section corresponding to the capacitive part 11a. Then, a prescribed number of the first sheets S11 are stacked and thermally compressed one by one, to form a section corresponding to the other of the dielectric margin parts 11b in the third direction. Then, on both of the third-direction faces, the third sheets S13 (including the groups of unsintered metal grain patterns P13) are stacked and thermally compressed in such a way that the groups of unsintered metal grain patterns P13 face outside. Finally, the entire sheets are thermally compressed to produce an unsintered multilayer sheet LS shown in FIG. 5. It should be noted that, while FIG. 5 depicts the unsintered multilayer sheet LS corresponding to one piece of the multilayer ceramic capacitor 10 for the purpose of illustration, the actual unsintered multilayer sheet LS is sized in such a way that multiple multilayer ceramic capacitors can be taken from it.

Next, the unsintered multilayer sheet LS that is sized in such a way that multiple multilayer ceramic capacitors can be taken from it, is cut into a grid, to produce unsintered capacitor bodies LC, each corresponding to one piece of the multilayer ceramic capacitor 10 (refer to FIG. 5). Each of the unsintered capacitor bodies LC has the multiple unsintered internal electrode layer patterns P12 inside, as well as the groups of unsintered metal grain patterns P13 on both of the third-direction faces.

Next, the unsintered capacitor bodies LC are put in a sintering oven and sintered (including binder removal) all at once, in a reducing ambience based on a temperature profile appropriate for barium titanate and nickel, to produce multiple pieces of the capacitor body 11 as shown in FIG. 6. Each capacitor body 11 has multiple internal electrode layers 12a1 inside, as well as the groups of metal grains 13 on both of the third-direction faces.

For the aforementioned temperature profile, one that causes the respective unsintered metal grain patterns P13 to shrink slightly during the course of sintering may be adopted, in which case the groups of unsintered metal grain patterns P13 directly become the groups of metal grains 13, and the surface of each of the metal grains 13a has a rounded finish.

Next, the electrode paste is dip-coated, applied, or printed on both first-direction ends of the capacitor body 11 and then dried to form unsintered base conductor films on both of the first-direction ends of the capacitor body 11. Then, these unsintered base conductor films are baked in an ambience similar to the foregoing, to produce the base conductor films FI1 for the respective external electrodes 12 (refer to FIG. 3). Next, each of the surface conductor films FI2 is produced in a manner covering the entire surface of each of the base conductor films FI1, using a wet plating method or a dry plating method (refer to FIG. 3). This completes the manufacturing of the aforementioned multilayer ceramic capacitor 10.

It should be noted that the base conductor films FI1 for the respective external electrodes 12 may be produced by forming unsintered base conductor films on both of the first-direction ends of the unsintered capacitor body LC shown in FIG. 5, and then sintering the films and the unsintered capacitor body LC.

Next, the effect achieved by the aforementioned multilayer ceramic capacitor 10 is explained.

The multilayer ceramic capacitor 10 has the groups of metal grains 13 provided over the first direction of the capacitor body 11 on both of the third-direction faces of the capacitor body 11. This means that, even when the multilayer ceramic capacitor 10 self-heats, the heat of the capacitor body 11 can be efficiently conducted to each of the groups of metal grains 13, and the conducted heat can be effectively released to the outside from each of the groups of metal grains 13. Particularly when air flows around the multilayer ceramic capacitor 10 mounted on a circuit board, disturbed air flows can be generated by the multiple metal grains 13a constituting each of the groups of metal grains 13, and therefore these disturbed air flows can be utilized to more effectively release the heat that has been conducted to each of the groups of metal grains 13. With respect to this heat dissipation, disturbed air flows are generated more easily as the number of the multiple metal grains 13a increases, so the number of the multiple metal grains 13a is preferably 3 or greater, or more preferably 10 or greater. In addition, no electrical current flows through the groups of metal grains 13 provided on both of the third-direction faces of the capacitor body 11, or, in other words, the insulation resistance value between the external electrodes 12 which are opposed to each other across each of the groups of metal grains 13 is $5.0 \times 10^5 \Omega$ or more, and this means that even when both of the first-direction ends of the groups of metal grains 13 are covered by the first parts 12b and the second parts 12c of the respective external electrodes 12 while the groups of metal grains 13 contact the first parts 12b and the second parts 12c, functional problems do not occur in the multilayer ceramic capacitor 10.

Here, the result of verifying the aforementioned effect (improvement of heat dissipation property) is explained. For the verification, Prototype A1 corresponding to the multilayer ceramic capacitor 10 and produced according to the aforementioned example of manufacturing method, and Prototype A2, for the comparison, having the structure of Prototype A1 except that the groups of metal grains 13 were not placed, were prepared. It should be noted that on Prototype A1, the groups of metal grains 13 were formed in such a way that the area ratio of the multiple metal grains 13a within the area of each of the third-direction faces of the capacitor body 11, except for each of the external electrodes 12, became 50%. Then, while applying 50 V of alternating-current voltage to Prototypes A1 and A2 in a room temperature condition of 25° C. at 500 MHz, the temperature rise and steady-state temperature (measured in a stable state after the temperature had stopped rising) of each prototype were checked using infrared images taken by an infrared temperature measurement machine (R300SR manufactured by Nippon Avionics). Based on the results, the steady-state temperature of Prototype A1 was 51° C., while the steady-state temperature of Prototype A2 was 74° C. In other words, the heat dissipation property of Prototype A1 was proven to be far better than the heat dissipation property of Prototype A2. It should be added that when variations of Prototype A1 having incrementally smaller area ratios were verified in a similar manner, those with an area ratio of 10% or higher demonstrated heat dissipation property better than that of Prototype A2; however, the variations with an area ratio of less than 10% did not demonstrate heat dissipation property better than that of Prototype A2.

Next, variation examples of the aforementioned multilayer ceramic capacitor 10 are explained using FIGS. 7 to 10 as deemed appropriate. It should be noted that the following variations may be adopted in combination as deemed appropriate.

First Variation Example

Figure 7:
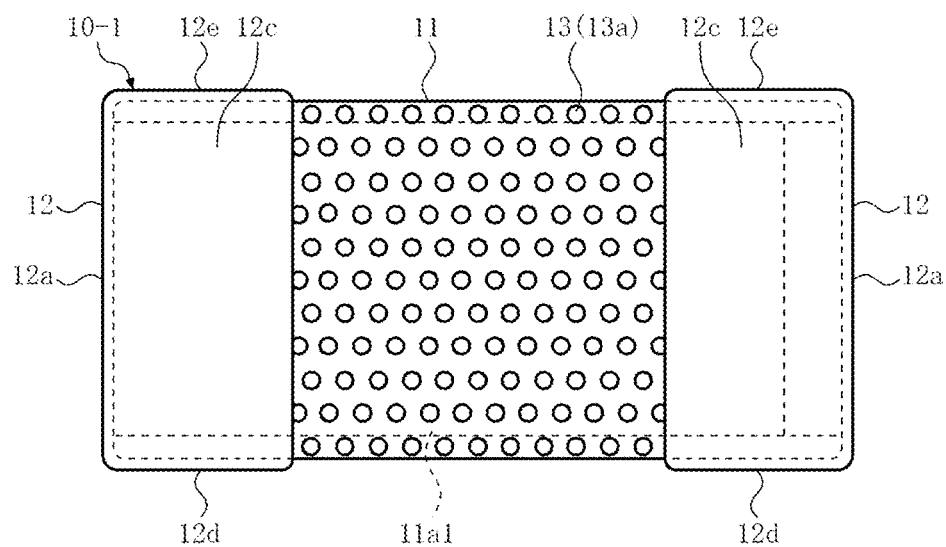
FIG. 7 is a view corresponding to FIG. 1, showing the first variation example of the multilayer ceramic capacitor shown in FIGS. 1 to 3.

A multilayer ceramic capacitor 10-1 shown in FIG. 7 is configured such that the multiple metal grains 13a constituting each of the groups of metal grains 13 are arranged in a staggered pattern instead of the matrix pattern. Obviously, the metal grains 13a may be arranged in any regular pattern other than a staggered pattern.

Second Variation Example

Figure 8:
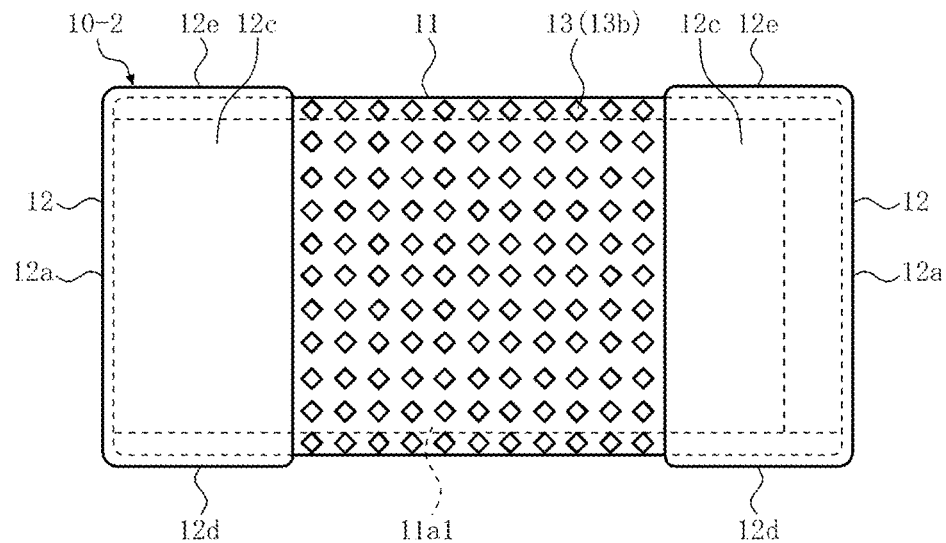
FIG. 8 is a view corresponding to FIG. 1, showing the second variation example of the multilayer ceramic capacitor shown in FIGS. 1 to 3.

A multilayer ceramic capacitor 10-2 shown in FIG. 8 is configured such that multiple metal grains 13b constituting each of the groups of metal grains 13 each have a rectangular outer shape instead. Obviously, the metal grains 13b may each have another outer shape, such as oval or triangle, besides rectangle.

Third Variation Example

Figure 9:
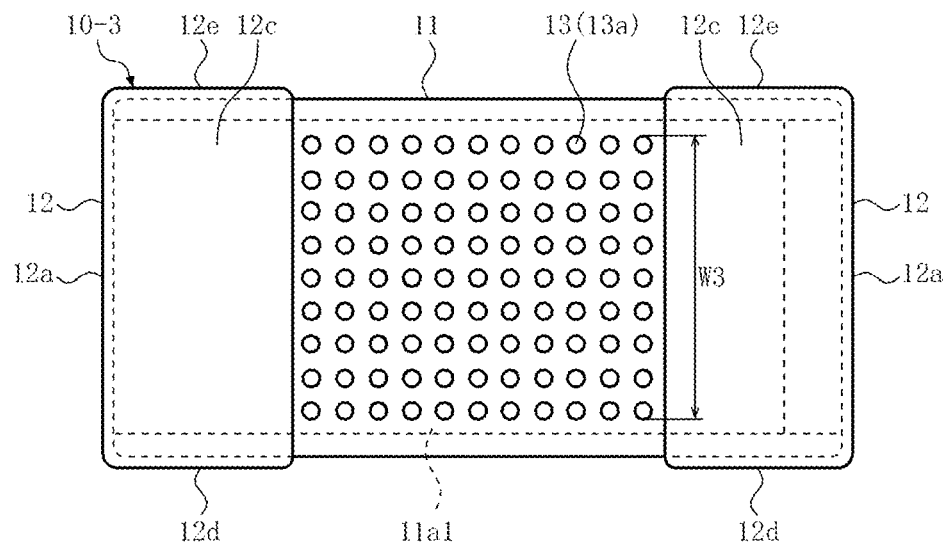
FIG. 9 is a view corresponding to FIG. 1, showing the third variation example of the multilayer ceramic capacitor shown in FIGS. 1 to 3.

A multilayer ceramic capacitor 10-3 shown in FIG. 9 is configured such that the second-direction reference dimension W3 of the area in which each of the groups of metal grains 13 is provided is smaller than the second-direction reference dimension W1 of the capacitor body 11. As a guideline on how to make the second-direction reference dimension W3 smaller than the second-direction reference dimension W1, one method is to match the second-direction reference dimension W3 with a second-direction reference dimension (not accompanied by a symbol) of the internal electrode layers 11a1.

Fourth Variation Example

Figure 10:
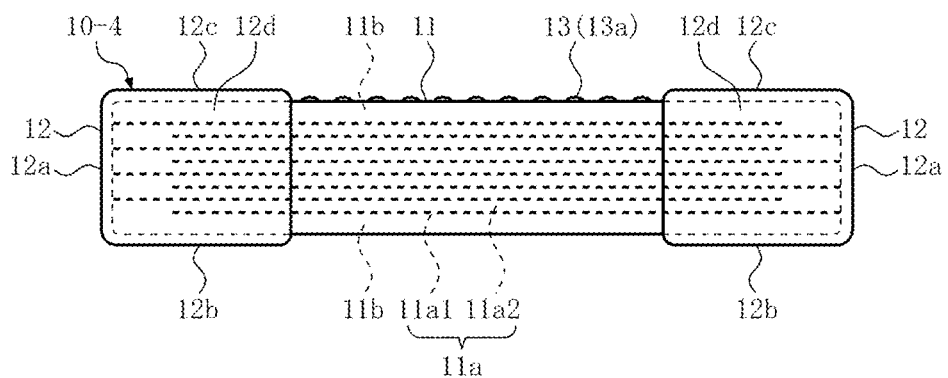
FIG. 10 is a view corresponding to FIG. 2, showing the fourth variation example of the multilayer ceramic capacitor shown in FIGS. 1 to 3.

A multilayer ceramic capacitor 10-4 shown in FIG. 10 is configured such that the group of metal grains 13 is provided only on the other third-direction face (only on the top face in FIG. 10) of the capacitor body 11. So long as this multilayer ceramic capacitor 10-4 is mounted on a circuit board in such a way that the group of metal grains 13 faces away from the circuit board, heat dissipation effect similar to the foregoing can be expected.

Fifth Variation Example

Figure 11:
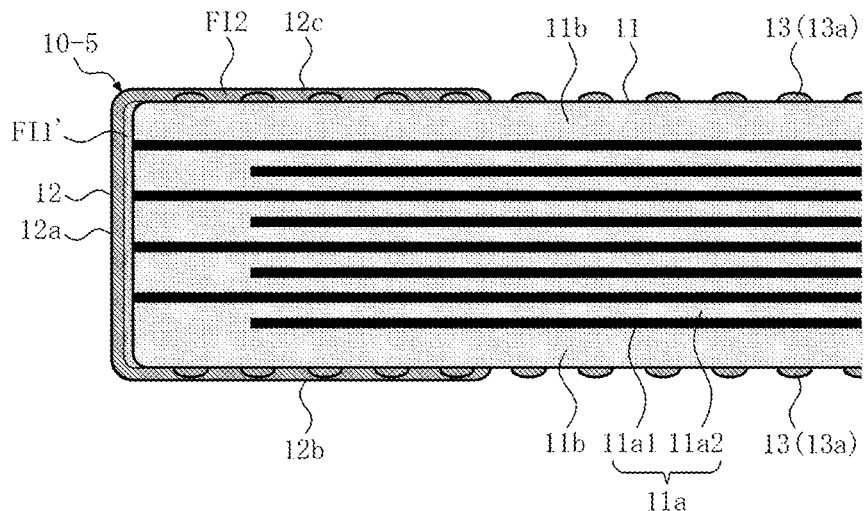
FIG. 11 is a view corresponding to FIG. 3, showing the fifth variation example of the multilayer ceramic capacitor shown in FIGS. 1 to 3.

A multilayer ceramic capacitor 10-5 shown in FIG. 11 is configured such that base conductor films FI1' for the respective external electrodes 12 are provided only on the first-direction faces (both the left face and right face in FIGS. 1 and 2) of the capacitor body 11. This way, a third-direction reference dimension (not accompanied by a symbol) of each of the first parts 12b, and a third-direction reference dimension (not accompanied by a symbol) of each of the second parts 12c, of each of the external electrodes 12, can be reduced, and consequently a third-direction reference dimension (corresponding to H in FIG. 2) of the multilayer ceramic capacitor 10-5 can be reduced.

Sixth Variation Example

Figure 12:
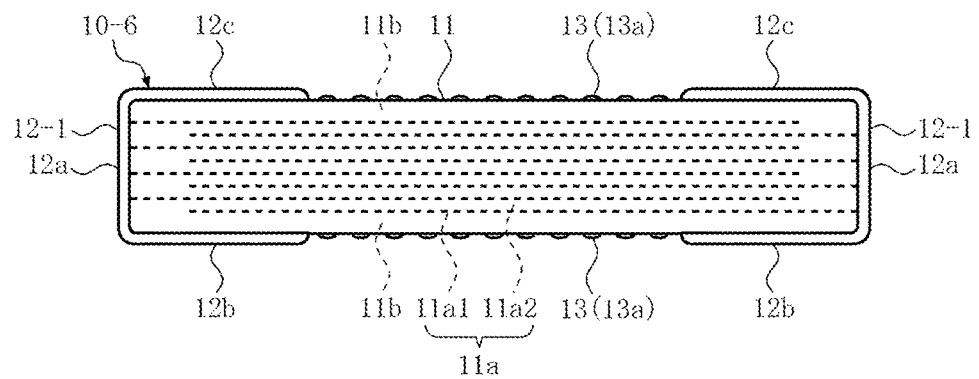
FIG. 12 is a view corresponding to FIG. 2, showing the sixth variation example of the multilayer ceramic capacitor shown in FIGS. 1 to 3.

A multilayer ceramic capacitor 10-6 shown in FIG. 12 is configured such that each of external electrodes 12-1 continuously has each of the base parts 12a, each of the first parts 12b, and each of the second parts 12c, with each of the third parts 12d and fourth parts 12e eliminated from it. This way, a second-direction reference dimension (corresponding to W in FIG. 1) of the multilayer ceramic capacitor 10-6 can be reduced because the third parts 12d and fourth parts 12e have been eliminated.

Seventh Variation Example

Figure 13:
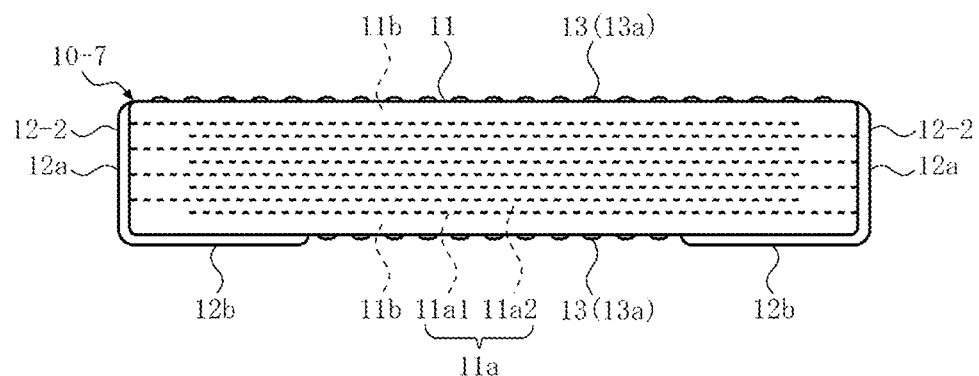
FIG. 13 is a view corresponding to FIG. 2, showing the seventh variation example of the multilayer ceramic capacitor shown in FIGS. 1 to 3.

A multi-layer ceramic capacitor 10-7 shown in FIG. 13 is configured such that each of the external electrodes 12-1 continuously has each of the base parts 12a and each of the first parts 12b, with each of the second parts 12c, the third parts 12d, and the fourth parts 12e eliminated from it. This way, a third-direction reference dimension (corresponding to H in FIG. 2) of the multilayer ceramic capacitor 10-7 can be reduced because the second parts 12c are eliminated, and a second-direction reference dimension (corresponding to W in FIG. 1) of the multilayer ceramic capacitor 10-7 can also be reduced because the third parts 12d and the fourth parts 12e are eliminated.

<Application to Other Multilayer Ceramic Electronic Components>

In the aforementioned first embodiment (including the first variation example to the seventh variation example), the structures, etc., are explained by assuming that the present invention is applied to a multilayer ceramic capacitor; however, the present invention is not limited to multilayer ceramic capacitors, and it may also be applied to multilayer ceramic inductors and other multilayer ceramic electronic components, each comprising a component body of roughly rectangular solid shape which has internal conductor layers, as well as a pair of external electrodes which are provided on the component body and also connected to the internal conductor layers.

Second Embodiment

This second embodiment is an application of the present invention to a multilayer ceramic capacitor. First, the structure of a multilayer ceramic capacitor 20 pertaining to the second embodiment of the present invention is explained using FIGS. 14 and 15. It should be noted that in the explanation below, for the sake of convenience, the same symbols are used for those parts that are constitutionally identical to the corresponding parts of the aforementioned multilayer ceramic capacitor 10 pertaining to the first embodiment. It should also be noted that in the explanation below, the following representation is used for the sake of convenience: that is, of the six faces of the capacitor body 11 of roughly rectangular solid shape as mentioned below, the direction in which a pair of faces are opposing each other (corresponding to the lateral direction in FIG. 1) is indicated as a first direction, the direction in which another pair of faces are opposing each other (corresponding to the vertical direction in FIG. 1) is indicated as a second direction, and the direction in which the remaining pair of faces are opposing each other (corresponding to the vertical direction in FIG. 2) is indicated as a third direction, while the dimensions along the respective directions are indicated as a first-direction dimension, a second-direction dimension, and a third-direction dimension. Also, in the following explanation, the term "reference dimension" means a design reference dimension that does not include any dimensional tolerance.

Figure 14:
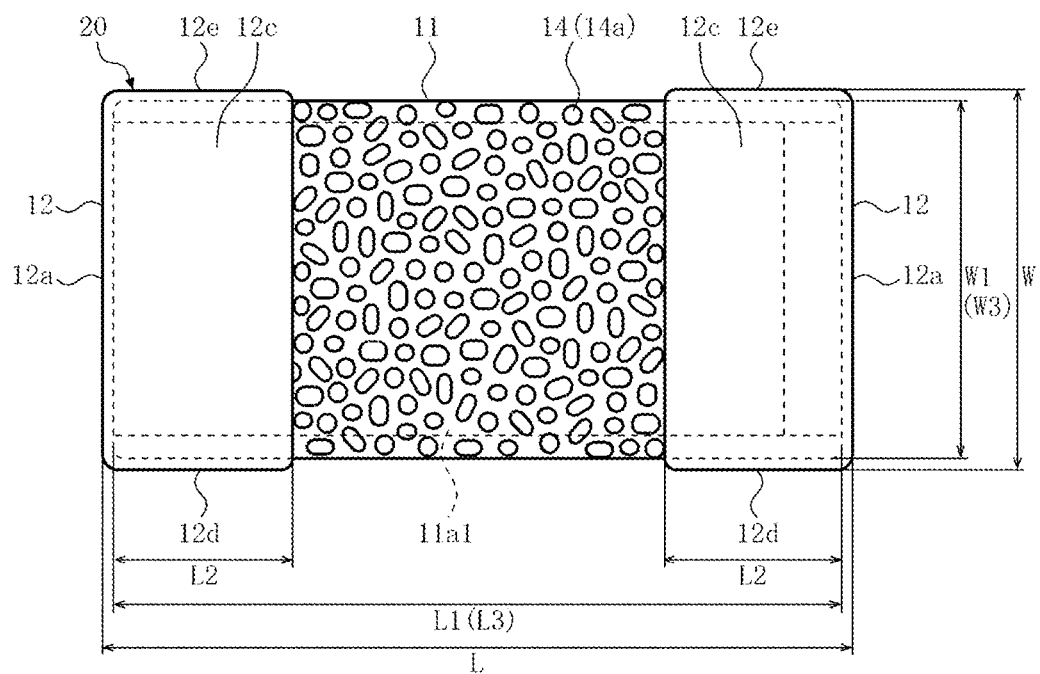
FIG. 14 is a plan view of the multilayer ceramic capacitor pertaining to the second embodiment of the present invention.
Figure 15:
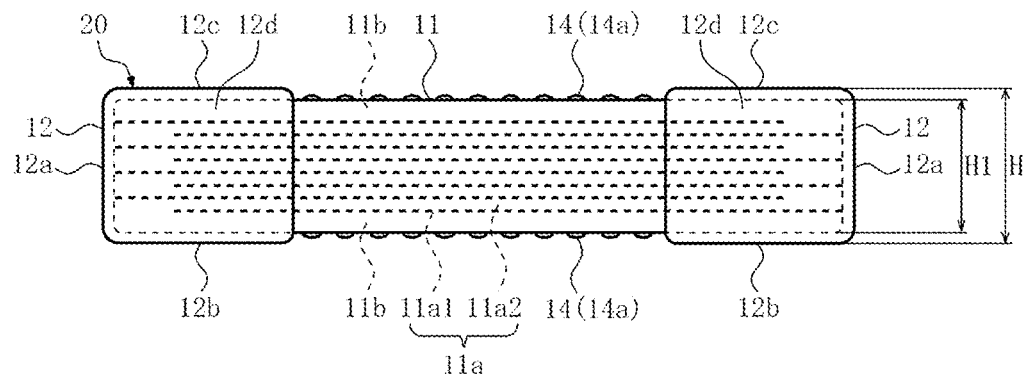
FIG. 15 is a side view of the multilayer ceramic capacitor shown in FIG. 14.

The size of the multilayer ceramic capacitor 20 shown in FIGS. 14 and 15 is regulated by a first-direction reference dimension L, a second-direction reference dimension W, and a third-direction reference dimension H. For reference, the L, W, and H of a prototype on which FIGS. 14 and 15 are based, are 1000 μm, 500 μm, and 200 μm, respectively. Obviously, the relation of the L, W, and H of the multilayer ceramic capacitor 20 may be "L>W=H," "L>H>W," "W>L>H," "W>L=H," "W>H>L," etc., other than "L>W>H." This multilayer ceramic capacitor 20 comprises a capacitor body 11, external electrodes 12 provided on both of the first-direction ends of the capacitor body 11, and groups of metal grains 14 provided on both of the third-direction faces of the capacitor body 11.

The capacitor body 11 is shaped roughly as a rectangular solid having a first-direction reference dimension L1, a second-direction reference dimension W1, and a third-direction reference dimension H1. This capacitor body 11 has a capacitive part 11a constituted by multiple internal electrode layers 11a1 stacked together with dielectric layers 11a2 in between, and dielectric margin parts 11b provided on both of the third-direction sides of the capacitive part 11a. It should be noted that, while FIG. 15 depicts a total of eight internal electrode layers 11a1 for the convenience of illustration, the number of the internal electrode layers 11a1 is not limited in any way.

Some (the odd-numbered ones from the top in FIG. 15) of the multiple internal electrode layers 11a1 are connected to one of base parts 12a of one (the left side in FIG. 15) of the external electrodes 12. Also, the remainder (the even-numbered ones from the top in FIG. 15) of the multiple internal electrode layers 11a1 are connected to the other of the base parts 12a of the other (the right side in FIG. 15) of the external electrodes 12.

Each of the internal electrode layers 11a1 has a roughly rectangular outer shape. A first-direction reference dimension (not accompanied by a symbol) of each of the internal electrode layers 11a1 is smaller than the first-direction reference dimension L1 of the capacitor body 11, while a second-direction reference dimension (not accompanied by a symbol) of each of the internal electrode layers 11a1 is smaller than the second-direction reference dimension W1 of the capacitor body 11. Also, a third-direction reference dimension (not accompanied by a symbol) of each of the internal electrode layers 11a1 is set in a range of 0.3 to 3 μm, for example.

Each of the dielectric layers 11a2 has a roughly rectangular outer shape. A first-direction reference dimension (not accompanied by a symbol) of each of the dielectric layers 11a2 is the same as the first-direction reference dimension L1 of the capacitor body 11, while a second-direction reference dimension (not accompanied by a symbol) of each of the dielectric layers 11a2 is the same as the second-direction reference dimension W1 of the capacitor body 11. Also, a third-direction reference dimension (not accompanied by a symbol) of each of the dielectric layers 11a2 is set in a range of 0.3 to 3 μm, for example.

Each of the dielectric margin parts 11b has a roughly rectangular outer shape. A first-direction reference dimension (not accompanied by a symbol) of each of the dielectric margin parts 11b is the same as the first-direction reference dimension L1 of the capacitor body 11, while a second-direction reference dimension (not accompanied by a symbol) of each of the dielectric margin parts 11b is the same as the second-direction reference dimension W1 of the capacitor body 11. Also, a third-direction reference dimension (not accompanied by a symbol) of each of the dielectric margin parts 11b is set in a range of 5 to 30 μm, for example.

The primary component of each of the internal electrode layers 11a1 is nickel, copper, palladium, platinum, silver, gold, alloy thereof, or other metal material, for example. The primary component of each of the dielectric layers 11a2 and that of each of the dielectric margin parts 11b, or specifically the primary component of the capacitor body 11 excluding the internal electrode layers 11a1, is barium titanate, strontium titanate, calcium titanate, magnesium titanate, calcium zirconate, calcium zirconate titanate, barium zirconate, or other dielectric material such as titanium oxide (dielectric ceramic material), for example. It should be noted that the primary component of each of the dielectric layers 11a2 may be the same as, or different from, the primary component of each of the dielectric margin parts 11b.

One (the left side in FIGS. 14 and 15) of the external electrodes 12 continuously has one of the base parts 12a present on one first-direction face (the left face in FIGS. 14 and 15) of the capacitor body 11, one of first parts 12b present on one third-direction face (the bottom face in FIG. 15) of the capacitor body 11, one of second parts 12c present on the other third-direction face (the top face in FIG. 15) of the capacitor body 11, one of third parts 12d present on one second-direction face (the bottom face in FIG. 14) of the capacitor body 11, and one of fourth parts 12e present on the other second-direction face (the top face in FIG. 14) of the capacitor body 11.

The other (the right side in FIGS. 14 and 15) of the external electrodes 12 continuously has the other of the base parts 12a present on the other first-direction face (the right face in FIGS. 14 and 15) of the capacitor body 11, the other of the first parts 12b present on one third-direction face (the bottom face in FIG. 15) of the capacitor body 11, the other of the second parts 12c present on the other third-direction face (the top face in FIG. 15) of the capacitor body 11, the other of the third parts 12d present on one second-direction face (the bottom face in FIG. 14) of the capacitor body 11, and the other of the fourth parts 12e present on the other second-direction face (the top face in FIG. 14) of the capacitor body 11.

A first-direction reference dimension (not accompanied by a symbol) of each of the base parts 12a, a third-direction reference dimension (not accompanied by symbols) of each of the first parts 12b and the second parts 12c, and a second-direction reference dimension (not accompanied by symbols) of each of the third parts 12d and the fourth parts 12e, of each of the external electrodes 12, are set in a range of 5 to 30 μm, for example. Also, a first-direction reference dimension L2 of each of the first parts 12b to the fourth parts 12e of each of the external electrodes 12 is set in a range of one-fifth to two-fifths of the first-direction reference dimension L of the multilayer ceramic capacitor 10, for example.

Although not illustrated, each of the external electrodes 12 is constituted by each of base conductor films contacting the first-direction faces (both the left face and right face in FIGS. 14 and 15), one third-direction face (the bottom face in FIG. 15), the other third-direction face (the top face in FIG. 15), one second-direction face (the bottom face in FIG. 14), and the other second-direction face (the top face in FIG. 14), of the capacitor body 11, and also by each of surface conductor films contacting the surface of each of the base conductor films, as well as each of the external electrodes 12 of the aforementioned multilayer ceramic capacitor 10 (refer to FIG. 3).

The primary component of each of the base conductor films is nickel, copper, palladium, platinum, silver, gold, alloy thereof, or other metal material, for example. Also, the primary component of each of the surface conductor films is copper, nickel, tin, palladium, gold, zinc, alloy thereof, or other metal material, for example. It should be noted that each of the external electrodes 12 may adopt a constitution whereby one or more intermediate conductor film(s), whose primary component is different, is/are present between each of the base conductor films and each of the surface conductor films, as well as each of the external electrodes 12 of the aforementioned multilayer ceramic capacitor 10.

Each of groups of metal grains 14, constituted by multiple metal grains 14a of roughly uniform outer shape that are arranged irregularly, is provided over the first direction of the capacitor body 11 on both of the third-direction faces of the capacitor body 11. To be specific, the outer shapes of the multiple metal grains 14a represent a mixture of various shapes, such as circle, oval, and rectangle, and their arrangement has no regularity. Also, the multiple metal grains 14a constituting each of the groups of metal grains 14 are arranged such that a space is present between the adjacent metal grains 14a, as a rule, which means that even when the metal grains 14a themselves have conductivity, electrical current does not flow through each of the groups of metal grains 14. In other words, the insulation resistance value between the external electrodes 12 which are opposed to each other across each of the groups of metal grains 14 is $5.0 \times 10^5 \Omega$ or higher (measured based on application of rated voltage and a charge time of 120 seconds).

On both of the third-direction faces of the capacitor body 11, a first-direction reference dimension L3 of the area on which each of the groups of metal grains 14 is provided is the same as the first-direction reference dimension L1 of the capacitor body 11, while a second-direction reference dimension W3 of the area is the same as the second-direction reference dimension W1 of the capacitor body 11. Also, preferably the maximum grain dimension among the multiple metal grains 14a, constituting each of the groups of metal grains 14, as viewed from the outer side in the third direction (grain dimension in the direction giving the largest size), is set in a range of 1 to 300 μm. In addition, preferably a third-direction reference dimension (not accompanied by a symbol) of the multiple metal grains 14a constituting each of the groups of metal grains 14 is set in a range of 0.3 to 3 μm. In other words, the third-direction reference dimension (not accompanied by a symbol) of the multiple metal grains 14a constituting each of the groups of metal grains 14 is smaller than the third-direction reference dimension (not accompanied by a symbol) of each of the first parts 12b and the second parts 12c of each of the external electrodes 12.

The groups of metal grains 14 provided on one third-direction face (the bottom face in FIG. 15) of the capacitor body 11 are covered by the first parts 12b of the respective external electrodes 12 at both of the first-direction ends, while the groups of metal grains 13 in the area other than both of the first-direction ends are exposed. Also, the groups of metal grains 13 provided on the other third-direction face (the top face in FIG. 15) of the capacitor body 11 are covered by the second parts 12c of the respective external electrodes 12 at both of the first-direction ends, while the groups of metal grains 14 in the area other than both of the first-direction ends are exposed.

Figure 16:
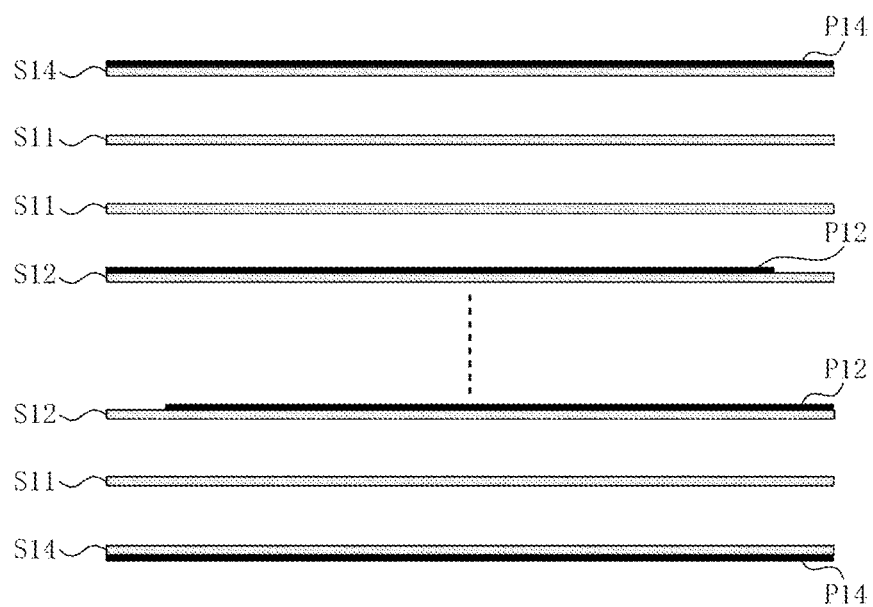
FIG. 16 is a drawing explaining an example of how the multilayer ceramic capacitor shown in FIGS. 14 and 15 is manufactured.
Figure 17:
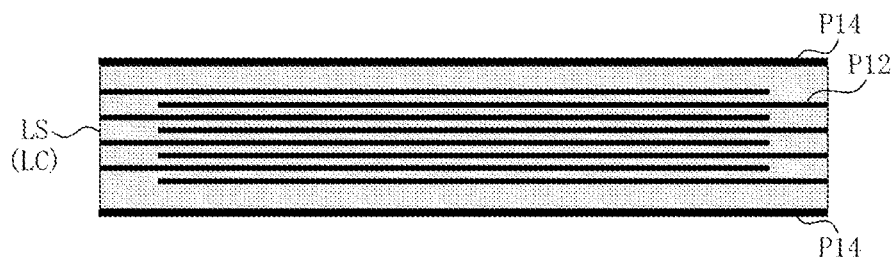
FIG. 17 is a drawing explaining an example of how the multilayer ceramic capacitor shown in FIGS. 14 and 15 is manufactured.
Figure 18:
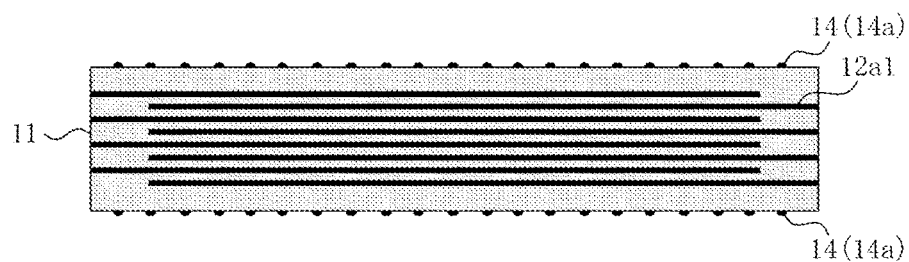
FIG. 18 is a drawing explaining an example of how the multilayer ceramic capacitor shown in FIGS. 14 and 15 is manufactured.

Next, an example of how the aforementioned multilayer ceramic capacitor 20 is manufactured, or specifically an example of manufacturing method when the primary component of the capacitor body 11 excluding the internal electrode layers 11a1 is barium titanate; the primary component of each of the internal electrode layers 11a1, the primary component of each of the base conductor films of each of the external electrodes 12, and the primary component of each of the groups of metal grains 14 are all nickel; and each of the surface conductor films of each of the external electrodes 12 is constituted by one film whose primary component is tin, is explained using FIGS. 16 to 18 and quoting the symbols indicated in FIGS. 14 and 15. The manufacturing method explained here is only an example and does not limit in any way how the aforementioned multilayer ceramic capacitor 20 is manufactured.

For the manufacture, first, a ceramic slurry containing barium titanate powder, organic solvent, organic binder, dispersant, etc., a first electrode paste containing nickel powder, organic solvent, organic binder, dispersant, etc., and a second electrode paste containing more organic binder than the first electrode paste, are prepared.

Next, as shown in FIG. 16, the ceramic slurry is coated on the surface of a carrier film and then dried, to produce each of first sheets (green sheets) S11. Also, the first electrode paste is printed on the surface of each of the first sheets S11 and then dried, to produce each of second sheets S12 with groups of unsintered matrix- or staggeringly arranged internal electrode layer patterns P12 which are formed on the surface of each of the first sheets S11. Furthermore, the second electrode paste is printed on the surface of each of the first sheets S11 and then dried, to produce each of third sheets S14 with unsintered metal patterns P14 which are formed in a manner covering the entire surface of each of the first sheets S11. It should be noted that, while FIG. 16 depicts the first sheets S11, the second sheets S12, and the third sheets S14 corresponding to one piece of the multilayer ceramic capacitor 20 for the purpose of illustration, each of the actual sheets S11, S12, and S14 is sized in such a way that multiple multilayer ceramic capacitors can be taken from them.

Next, a prescribed number of the first sheets S11 are stacked and thermally compressed one by one, to form a section corresponding to one of the dielectric margin parts 11b in the third direction. Then, a prescribed number of the second sheets S12 (including the groups of unsintered internal electrode layer patterns P12) are stacked and thermally compressed one by one, to form a section corresponding to the capacitive part 11a. Then, a prescribed number of the first sheets S11 are stacked and thermally compressed one by one, to form a section corresponding to the other of the dielectric margin parts 11b in the third direction. Then, on both of the third-direction faces, the third sheets S14 (including the unsintered metal patterns P14) are stacked and thermally compressed in such a way that the groups of unsintered metal patterns P14 face outside. Finally, the entire sheets are thermally compressed to produce an unsintered multilayer sheet LS shown in FIG. 17. It should be noted that, while FIG. 17 depicts the unsintered multilayer sheet LS corresponding to one piece of the multilayer ceramic capacitor 20 for the purpose of illustration, the actual unsintered multilayer sheet LS is sized in such a way that multiple multilayer ceramic capacitors can be taken from it.

Next, the unsintered multilayer sheet LS that is sized in such a way that multiple multilayer ceramic capacitors can be taken from it, is cut into a grid, to produce unsintered capacitor bodies LC, each corresponding to one piece of the multilayer ceramic capacitor 20 (refer to FIG. 17). Each of the unsintered capacitor bodies LC has the multiple unsintered internal electrode layer patterns P12 inside, as well as the groups of unsintered metal grain patterns P14 on both of the third-direction faces.

Next, the unsintered capacitor bodies LC are put in a sintering oven and sintered (including binder removal) all at once, in a reducing ambience based on a temperature profile appropriate for barium titanate and nickel, to produce multiple pieces of the capacitor body 11 as shown in FIG. 18. Each capacitor body 11 has multiple internal electrode layers 12a1 inside, as well as the groups of metal grains 14 on both of the third-direction faces.

For the aforementioned temperature profile, when one that causes the unsintered metal patterns P14 to shrink during the course of sintering is adopted, the unsintered metal patterns P14 directly become the groups of metal grains 14, and the surface of each of the metal grains 14a has a rounded finish.

Next, the electrode paste is dip-coated, applied, or printed on both first-direction ends of the capacitor body 11 and then dried to form unsintered base conductor films on both of the first-direction ends of the capacitor body 11. Then, these unsintered base conductor films are baked in an ambience similar to the foregoing, to produce the base conductor films for the respective external electrodes 12. Next, each of the surface conductor films is produced in a manner covering the entire surface of each of the base conductor films, using a wet plating method or a dry plating method. This completes the manufacturing of the aforementioned multilayer ceramic capacitor 20.

It should be noted that the base conductor films for the respective external electrodes 12 may be produced by forming unsintered base conductor films on both of the first-direction ends of the unsintered capacitor body LC shown in FIG. 17, and then sintering the films and the unsintered capacitor body LC.

Next, the effect achieved by the aforementioned multilayer ceramic capacitor 20 is explained.

The multilayer ceramic capacitor 20 has the groups of metal grains 14 provided over the first direction of the capacitor body 11 on both of the third-direction faces of the capacitor body 11. This means that, even when the multilayer ceramic capacitor 20 self-heats, the heat of the capacitor body 11 can be efficiently conducted to each of the groups of metal grains 14, and the conducted heat can be effectively released to the outside from each of the groups of metal grains 14. Particularly when air flows around the multilayer ceramic capacitor 20 mounted on a circuit board, disturbed air flows can be generated by the multiple metal grains 14a constituting each of the groups of metal grains 14, and therefore these disturbed air flows can be utilized to more effectively release the heat that has been conducted to each of the groups of metal grains 14. With respect to this heat dissipation, disturbed air flows are generated more easily as the number of the multiple metal grains 14a increases, so the number of the multiple metal grains 14a is preferably 3 or greater, or more preferably 10 or greater. In addition, no electrical current flows through the groups of metal grains 14 provided on both of the third-direction faces of the capacitor body 11, or, in other words, the insulation resistance value between the external electrodes 12 which are opposed to each other across each of the groups of metal grains 14 is $5.0 \times 10^5 \Omega$ or more, and this means that even when both of the first-direction ends of the groups of metal grains 14 are covered by the first parts 12b and the second parts 12c of the respective external electrodes 12 while the groups of metal grains 14 contact the first parts 12b and the second parts 12c, functional problems do not occur in the multilayer ceramic capacitor 20.

Here, the result of verifying the aforementioned effect (improvement of heat dissipation property) is explained. For the verification, Prototype B1 corresponding to the multilayer ceramic capacitor 20 and produced according to the aforementioned example of manufacturing method, and Prototype B2, for the comparison, having the structure of Prototype B1 except that the groups of metal grains 14 were removed, were prepared. It should be noted that on Prototype B1, the groups of metal grains 14 were formed in such a way that the area ratio of the multiple metal grains 14a within the area of each of the third-direction faces of the capacitor body 11, except for each of the external electrodes 12, became 60%. Then, while applying 50 V of alternating-current voltage to Prototypes B1 and B2 in a room temperature condition of 25° C. at 500 MHz, the temperature rise and steady-state temperature (measured in a stable state after the temperature had stopped rising) of each prototype were checked using infrared images taken by an infrared temperature measurement machine (R300SR manufactured by Nippon Avionics). Based on the results, the steady-state temperature of Prototype B1 was 49° C., while the steady-state temperature of Prototype B2 was 74° C. In other words, the heat dissipation property of Prototype B1 was proven to be far better than the heat dissipation property of Prototype B2. It should be added that when variations of Prototype B1 having incrementally smaller area ratios were verified in a similar manner, those with an area ratio of 10% or higher demonstrated heat dissipation property better than that of Prototype B2; however, the variations with an area ratio of less than 10% did not demonstrate heat dissipation property better than that of Prototype B2.

Next, variation examples of the aforementioned multilayer ceramic capacitor 20 are explained using FIGS. 19 to 22 as deemed appropriate. It should be noted that the following variations may be adopted in combination as deemed appropriate.

First Variation Example

Figure 19:
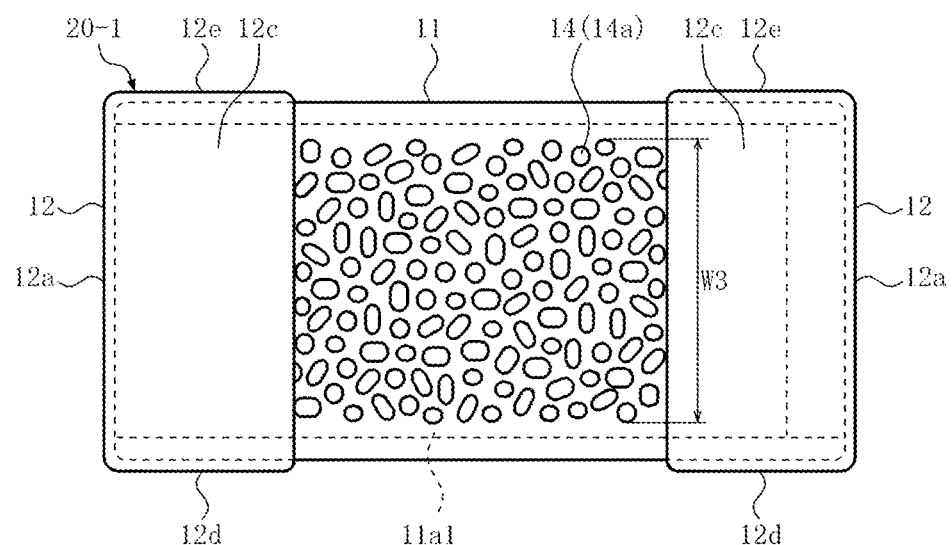
FIG. 19 is a view corresponding to FIG. 14, showing the first variation example of the multilayer ceramic capacitor shown in FIGS. 14 and 15.

A multilayer ceramic capacitor 20-1 shown in FIG. 19 is configured such that the second-direction reference dimension W3 of the area in which each of the groups of metal grains 14 is provided is smaller than the second-direction reference dimension W1 of the capacitor body 11. As a guideline on how to make the second-direction reference dimension W3 smaller than the second-direction reference dimension W1, one method is to match the second-direction reference dimension W3 with a second-direction reference dimension (not accompanied by a symbol) of the internal electrode layers 11a1.

Second Variation Example

Figure 20:
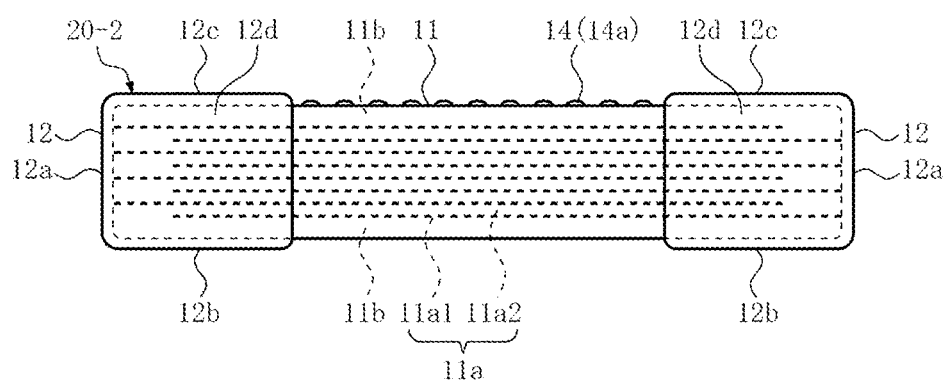
FIG. 20 is a view corresponding to FIG. 15, showing the second variation example of the multilayer ceramic capacitor shown in FIGS. 14 and 15.

A multilayer ceramic capacitor 20-2 shown in FIG. 20 is configured such that the group of metal grains 14 is provided only on the other third-direction face (only on the top face in FIG. 20) of the capacitor body 11. So long as this multilayer ceramic capacitor 20-2 is mounted on a circuit board in such a way that the group of metal grains 14 faces away from the circuit board, heat dissipation effect similar to the foregoing can be expected.

Third Variation Example

While not illustrated, a multilayer ceramic capacitor pertaining to this third variation example is configured such that base conductor films for the respective external electrodes 12 are provided only on the first-direction faces (both the left face and right face in FIGS. 14 and 15) of the capacitor body 11, as well as the multilayer ceramic capacitor 10-5 shown in FIG. 11. This way, a third-direction reference dimension (not accompanied by a symbol) of each of the first parts 12b, and a third-direction reference dimension (not accompanied by a symbol) of each of the second parts 12c, of each of the external electrodes 12, can be reduced, and consequently a third-direction reference dimension (corresponding to H in FIG. 15) of the multilayer ceramic capacitor can be reduced.

Fourth Variation Example

Figure 21:
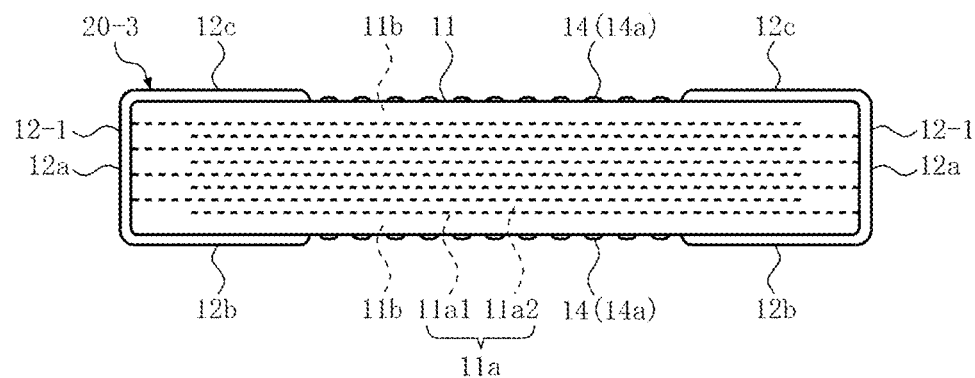
FIG. 21 is a view corresponding to FIG. 15, showing the fourth variation example of the multilayer ceramic capacitor shown in FIGS. 14 and 15.

A multilayer ceramic capacitor 20-3 shown in FIG. 21 is configured such that each of external electrodes 12-1 continuously has each of the base parts 12a, each of the first parts 12b, and each of the second parts 12c, with each of the third parts 12d and fourth parts 12e eliminated from it. This way, a second-direction reference dimension (corresponding to W in FIG. 14) of the multilayer ceramic capacitor 20-3 can be reduced because the third parts 12d and fourth parts 12e have been eliminated.

Fifth Variation Example

Figure 22:
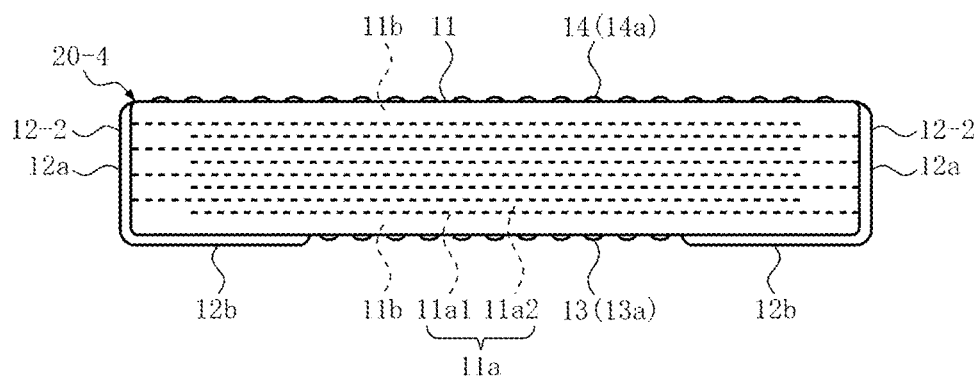
FIG. 22 is a view corresponding to FIG. 15, showing the fifth variation example of the multilayer ceramic capacitor shown in FIGS. 14 and 15.

A multi-layer ceramic capacitor 20-4 shown in FIG. 22 is configured such that each of the external electrodes 12-1 continuously has each of the base parts 12a and each of the first parts 12b, with each of the second parts 12c, the third parts 12d, and the fourth parts 12e eliminated from it. This way, a third-direction reference dimension (corresponding to H in FIG. 15) of the multilayer ceramic capacitor 20-4 can be reduced because the second parts 12c are eliminated, and a second-direction reference dimension (corresponding to W in FIG. 14) of the multilayer ceramic capacitor 20-4 can also be reduced because the third parts 12d and the fourth parts 12e are eliminated.

<Application to Other Multilayer Ceramic Electronic Components>

In the aforementioned second embodiment (including the first variation example to the fifth variation example), the structures, etc., are explained by assuming that the present invention is applied to a multilayer ceramic capacitor; however, the present invention is not limited to multilayer ceramic capacitors, and it may also be applied to multilayer ceramic inductors and other multilayer ceramic electronic components, each comprising a component body of roughly rectangular solid shape which has internal conductor layers, as well as a pair of external electrodes which are provided on the component body and also connected to the internal conductor layers.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-244041, filed Dec. 16, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic electronic component comprising:
a component body of roughly rectangular solid shape having a dielectric body in which internal conductor layers are embedded, and a pair of external electrodes provided on the component body and also connected to the internal conductor layers, wherein:
when, of the six faces of the component body, a direction in which a first pair of faces are opposing each other is given as a first direction, a direction in which a second pair of faces are opposing each other is given as a second direction, and a direction in which a third pair of faces are opposing each other is given as a third direction,
each of the external electrodes is constituted by a base part present on one first-direction face of the component body, and a first part, continuously from the base part, present at least on one third-direction face, among the one third-direction face, the other third-direction face, one second-direction face, and the other second-direction face, of the component body; and
a group of metal protrusions is provided along the first direction of the component body only over the one third-direction face and/or the other third-direction face, both of which are dielectric, of the component body, in a manner separating the respective metal protrusions from each other on a dielectric surface of the other third-direction face so that no electrical current flows through the group of metal protrusions, whereby dispersing heat through the protrusions.

2. The multilayer ceramic electronic component according to claim 1, wherein a first-direction reference dimension of an area in which the group of metal protrusions is provided is the same as a first-direction reference dimension of the component body, and a second-direction reference dimension of the area is the same as a second-direction reference dimension of the component body.

3. A multilayer ceramic electronic component comprising:
a component body of roughly rectangular solid shape having internal conductor layers and a pair of external electrodes provided on the component body and also connected to the internal conductor layers, wherein:
when, of the six faces of the component body, a direction in which a first pair of faces are opposing each other is given as a first direction, a direction in which a second pair of faces are opposing each other is given as a second direction, and a direction in which a third pair of faces are opposing each other is given as a third direction,
each of the external electrodes is constituted by a base part present on one first-direction face of the component body, and a first part, continuously from the base part, present at least on one third-direction face, among the one third-direction face, the other third-direction face, one second-direction face, and the other second-direction face, of the component body; and
a group of metal grains is provided along the first direction of the component body over at least the other third-direction face, among the one third-direction face and the other third-direction face, of the component body,
wherein a first-direction reference dimension of an area in which the group of metal grains is provided is the same as a first-direction reference dimension of the component body, and a second-direction reference dimension of the area is smaller than a second-direction reference dimension of the component body.

4. The multilayer ceramic electronic component according to claim 1, wherein the group of metal protrusions is constituted by multiple metal grains that are arranged regularly.

5. The multilayer ceramic electronic component according to claim 1, wherein the group of metal protrusions is constituted by multiple metal grains that are arranged irregularly or randomly.

6. The multilayer ceramic electronic component according to claim 1, wherein the group of metal protrusions is provided on both of the other third-direction face and the one third-direction face of the component body.

7. The multilayer ceramic electronic component according to claim 1, wherein the group of metal protrusions is provided only on the other third-direction face of the component body.

8. The multilayer ceramic electronic component according to claim 1, wherein each of the external electrodes is constituted continuously by the base part present on the one first-direction face of the component body, the first part present on the one third-direction face of the component body, a second part present on the other third-direction face of the component body, a third part present on one second-direction face of the component body, and a fourth part present on the other second-direction face of the component body.

9. The multilayer ceramic electronic component according to claim 1, wherein each of the external electrodes is constituted continuously by the base part present on the one first-direction face of the component body, the first part present on the one third-direction face of the component body, and a second part present on the other third-direction face of the component body.

10. The multilayer ceramic electronic component according to claim 8, wherein the group of metal protrusions provided at least on the other third-direction face of the component body is covered by the second parts of the respective external electrodes at both of the first-direction ends, and the group of metal protrusions in an area other than both of the first-direction ends is exposed.

11. The multilayer ceramic electronic component according to claim 1, wherein each of the external electrodes is constituted continuously by the base part present on the one first-direction face of the component body and the first part present on the one third-direction face of the component body.

12. The multilayer ceramic electronic component according to claim 11, wherein the group of metal protrusions provided at least on the other third-direction face of the component body is entirely exposed, except for an area in contact with the other third-direction face.

13. The multilayer ceramic electronic component according to claim 1, wherein the multilayer ceramic electronic component is a multilayer ceramic capacitor, and the multilayer ceramic capacitor comprises a capacitor body of roughly rectangular solid shape, as the component body, which has a capacitive part constituted by multiple internal electrode layers, as the internal conductor layers, stacked together with dielectric layers in between, and the pair of external electrodes which are provided on the capacitor body and to which the multiple internal electrode layers are connected.

14. A multilayer ceramic electronic component comprising:
a component body of roughly rectangular solid shape having internal conductor layers and a pair of external electrodes provided on the component body and also connected to the internal conductor layers, wherein:

when, of the six faces of the component body, a direction in which a first pair of faces are opposing each other is given as a first direction, a direction in which a second pair of faces are opposing each other is given as a second direction, and a direction in which a third pair of faces are opposing each other is given as a third direction, each of the external electrodes is constituted by a base part present on one first-direction face of the component body, and a first part, continuously from the base part, present at least on one third-direction face, among the one third-direction face, the other third-direction face, one second-direction face, and the other second-direction face, of the component body; and a group of metal grains is provided along the first direction of the component body over at least the other third-direction face, among the one third-direction face and the other third-direction face, of the component body, wherein an insulation resistance value between the external electrodes which are opposed to each other across the group of metal grains is $5.0 \times 10^5 \Omega$ or higher.

* * * * *